March 17, 1970   W. W. TOY   3,500,637
GAS TURBINE ENGINE WITH AERODYNAMIC TORQUE CONVERTER DRIVE
Filed Jan. 26, 1968   2 Sheets-Sheet 1

INVENTOR.
WILLIAM W. TOY
BY
Barnes, Kisselle, Raisch & Choate
ATTORNEYS

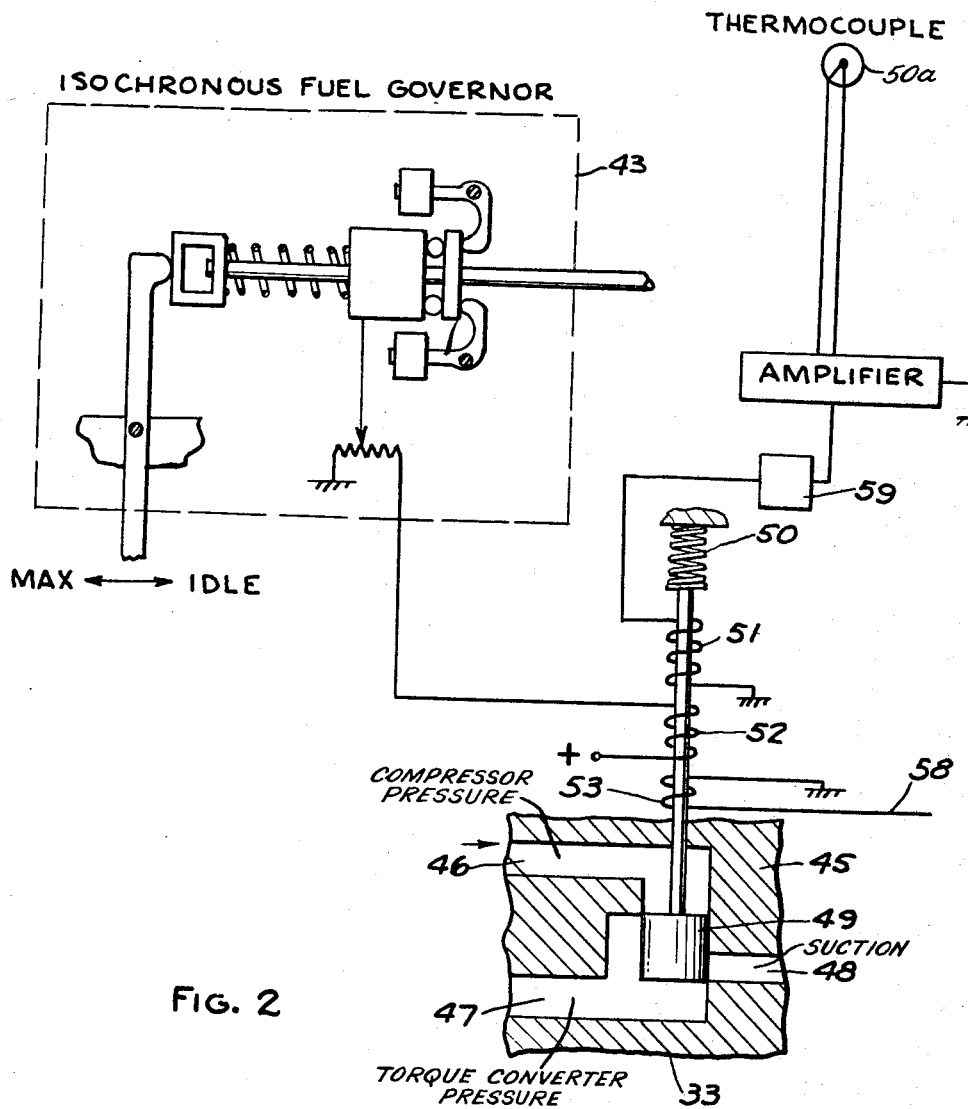

United States Patent Office 3,500,637
Patented Mar. 17, 1970

3,500,637
GAS TURBINE ENGINE WITH AERODYNAMIC TORQUE CONVERTER DRIVE
William W. Toy, Bloomfield, Mich., assignor of fifty percent to Lewis G. Harmon, Birmingham, Mich.
Filed Jan. 26, 1968, Ser. No. 700,942
Int. Cl. F02b *61/00;* F02g *3/00;* F16d *33/12*
U.S. Cl. 60—39.03
14 Claims

ABSTRACT OF THE DISCLOSURE

A gas turbine engine including a compressor, a turbine, a combustor, and a heat exchanger, is combined with an aerodynamic torque converter. The torque converter has a casing filled with a compressible fluid, namely air, and mechanically includes a stator, an input rotor, and an output rotor which is driven by fluid action upon rotation of the input rotor. The input rotor of the torque converter is connected to and driven by the rotor of said turbine. A first fluid line extends between the outlet of the compressor and a pressure area of the casing of the torque converter. A second fluid line extends from the casing of the torque converter to a point ahead of the inlet to the turbine. A valve in the first fluid line is operable to control the fluid delivery to the torque converter casing and to variably dump fluid therefrom, in response to varying turbine temperature and to pressure differentials between the casing and the compressor outlet, as well as to certain engine speed conditions.

---

This invention relates to gas turbine engines and particularly to the transmission of power from gas turbine engines to perform work.

In the use of a gas turbine, speed reduction is required since the gas turbine shaft rotates at relatively high speed. Conventional means for achieving speed reduction utilize mechanical gears for reducing the speed, and free power turbines are utilized to achieve substantial power over a wide range of speeds. In the patent to Charles C. Hill 3,314,232, issued Apr. 18, 1967, there is disclosed a gas turbine engine with aerodynamic torque converter drive which utilizes a single shaft gas turbine engine and an aerodynamic torque converter having a casing filled with a compressible fluid. Such a system produces speed reduction without gears or hydraulic converter, effects recovery of transmission losses, provides superior starting and acceleration without the use of variable vanes, and has more desirable low output speed-torque characteristics.

The primary object of the present invention is to provide for such a gas turbine engine with aerodynamic torque converter drive an improved system for controlling the fluid density in the torque converter in accordance with power and load requirements. This control system is relatively simple and easily adjusted, has a rapid response to conditions of engine acceleration and deceleration and will operate with minimum net air bleed from the engine gas cycle to achieve maximum thermodynamic recovery of converter losses and optimum turbine performance.

In the drawings:

FIG. 2 is a schematic drawing of the control valve and condition signalling components utilized in the system shown in FIG. 1.

Figure 1:
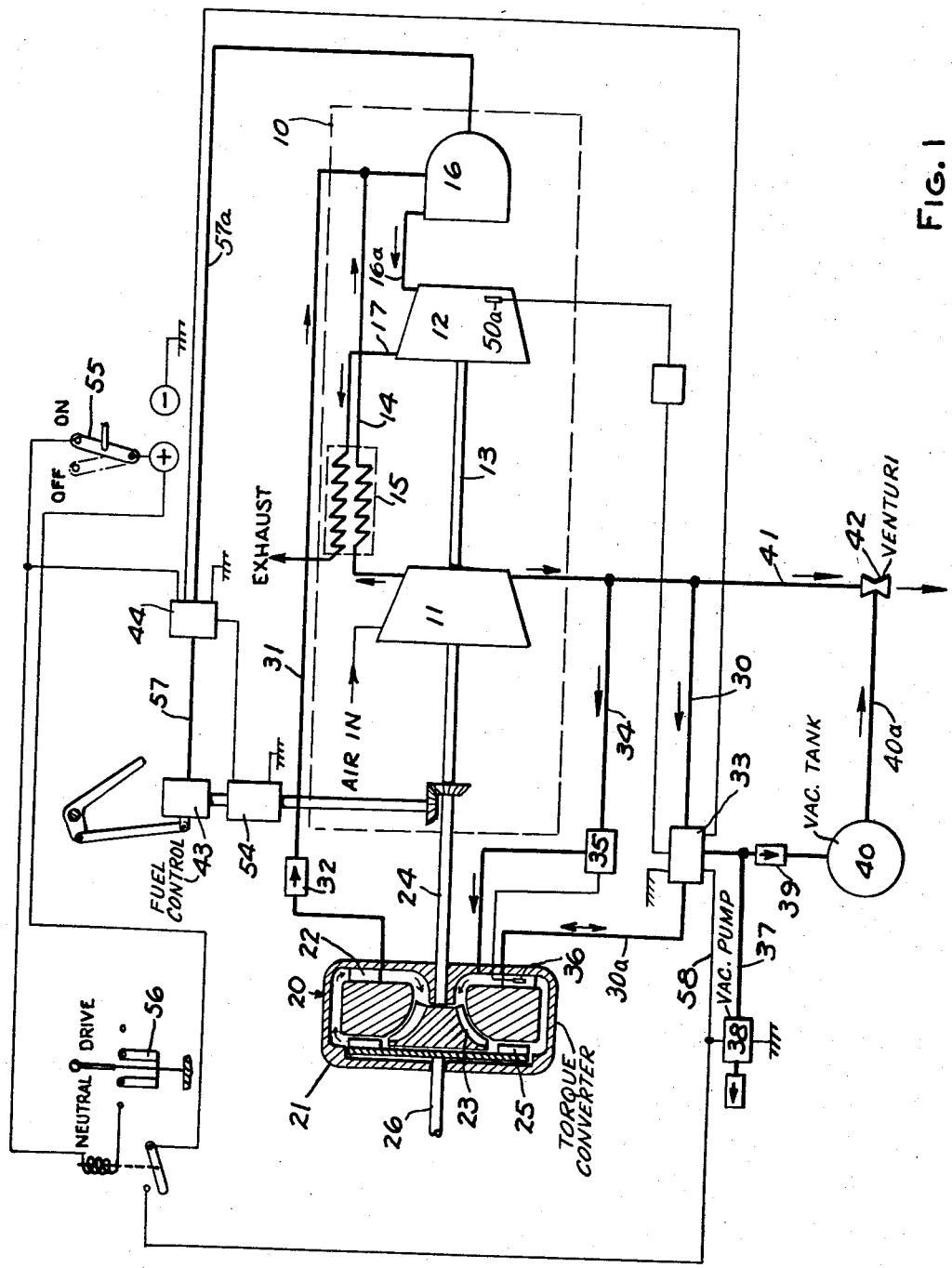
FIG. 1 is a part sectional diagrammatic view of a gas turbine engine with an aerodynamic torque converter drive embodying the control system of the present invention.

Referring to FIG. 1, a conventional single shaft gas engine turbine 10 includes a compressor 11 and a turbine 12 that preferably have their rotors directly connected as by a single shaft 13. The major portion of the compressed air from the compressor 11 flows through a line 14 forming a part of a heat exchanger 15 to the combustor 16 of the gas turbine engine 10. The combustor 16 defines its high temperature gas to the turbine 12 through a line 16a. The exhaust gases from the turbine 12 flow through a line 17 in heat exchange relation to the line 14 of the heat exchanger 15. Basically, the above components are conventional for gas turbine engines.

An aerodynamic torque converter 20 is provided, comprising a casing 21 with fixed guide vanes 22 and an input rotor 23 that is connected by a shaft 24 to the outlet rotor (not shown) of the compressor 11. The casing 21 is adapted to be filled with compressible fluid, namely air, which is delivered from the compressor so that upon rotation of the rotor 23, the flow of air exerts a torque on an output rotor 25 to rotate an output shaft 26 of the torque converter 20. For purposes of clarity, the torque converter has been shown as a single stage turbine having a single output rotor 25 but it may be a multiple stage turbine. Although, the torque converter is preferably shown as an outward radial flow turbine type, axial flow design may also be used.

As further shown in FIG. 1, a first fluid line 30 extends from the discharge side of the compressor 11 to a valve 33, from which the fluid is variably delivered through a line 30a to the interior of the casing 21 of the torque converter 20. A second fluid line 31 extends from the interior of the casing 21 of the torque converter 20 to the upstream gas cycle side of the turbine 12 and preferably to a point ahead of the combustor 16. A one-way check valve 32 is provided in the line 31 so that flow can occur in the line 31 only from the interior of the casing 21 to the combustor 16 when the pressure in the casing 21 is higher than the combustor inlet pressure, which in the present case will be substantially the compressor outlet pressure.

The valve 33 between lines 30, 30a operates to direct pressurized air flow from the compressor 11 to the interior of the casing 21 in normal operation. Also, as will be explained, the valve 33 operates to interrupt the flow from and discharge fluid from the casing 21 outwardly from the valve 33.

Another line 34 extends between the discharge side of the compressor 11 and casing 21 through a valve 35 interposed in the line 34 and responsive to temperature within the casing 21 signalled by a temperature sensitive element 36 in the casing 21 to permit flow of cooling air from the compressor 11 to the interior of the casing 21 when the temperature in the casing exceeds a predetermined value.

As further shown in FIG. 1, a line 37 extends from the valve 33 to a vacuum pump 38 that is operable at starting, as will be described. The valve 33 is also connected through a one-way check valve 39 to a vacuum tank 40. A sub-atmospheric pressure in the vacuum tank 40 is maintained by operation of a venturi 42 through which a small continuous flow of air is delivered by means of a line 41 extending from the discharge side of the compressor 11 functioning to continuously aspirate air from the tank 40 through a line 40a.

The gas turbine engine further includes a manually controlled engine governor and fuel control 43 that is operable to vary the fuel supply through a line 57 to a starting sequence control 44 and in turn through a line 57a to the combustor of the gas turbine engine for mixture with and combustion in the air delivered from the compressor 11.

As previously set forth, the valve 33 is operable to direct flow through the lines 30 and 30a between the compressor 11 and the casing 21 or to interrupt the flow so that flow can occur between the casing 21 and exterior of the valve, namely, to the vacuum tank 40. The valve 33 is shown diagrammatically in FIG. 2 and comprises a valve body 45 having a port 46 that is connected to the line 30 leading from discharge side of the compressor 11, a port 47 that is connected to the line 30a leading to the torque converter 20, and a port 48 that is connected to the vacuum tank 40 and via the line 37 to the vacuum pump. A piston 49 is provided to control communication between the ports and is shown in the null position. When the piston 49 is operated downwardly from the position shown the ports 46 and 47 are in communication to supply compressor fluid under pressure to the casing 21. The piston 49 is yieldingly urged into the down position by a spring 50. The piston 49 is moved upwardly from the position shown in opposition to the biasing action of the spring 50 in response to a temperature signal of the turbine 12 applied by a coil 51 connected with a thermocouple 50a to variably throttle the flow from port 46 to port 47 and finaly interrupt the flow. Further upward actuation of the piston 49 will open communication between the ports 47, 48 to exhaust fluid from the casing 21. The temperature signal of the turbine thermocouple 50a is modified by the first derivative of temperature in respect to time in a first derivative feed back unit 59 in order to minimize or eliminate overshooting of the response relative to a selected turbine gas temperature during rapid temperature excursions.

In addition, the piston 49 is moved upwardly in response to a signal applied by a coil 52 energized from the engine governor and fuel control 43 which measures the difference between the speed setting of the control 43 and the actual speed of the turbine 12 effecting piston 49 movement in opposition to the biasing action of the spring 50 to also modulate the flow to and from the torque converter casing 21. A further force is applied to the piston 49 by the differential in pressures between the ports 46 and 47 acting on the opposite sides of the piston 49.

Valve 33 is thus responsive to (1) the temperature of the turbine 12, (2) the pressure differential between the compressor and the casing 21 of the aerodynamic torque converter 20, and (3) the difference between the speed setting of the control 43 and the actual speed of the turbine 12.

OPERATION

In order to start the gas turbine engine 10, a control 56 is first moved to its neutral position, and an on-off control 55 is moved to the "on" position to actuate a sequencing control 44 and energize a starting motor 54 to start the gas turbine engine 10 in accordance with well-known practice. Simultaneously, in this position, the vacuum pump 38 is started and a coil 53 is energized to operate the valve 33 upwardly to the position wherein communication is provided between the ports 47 and 48 and communication between the ports 46 and 47 is closed. This permits the vacuum pump 38 to evacuate the casing 21 of the torque converter 20 while the check valve 32 and the valve 33 block prevents flow from the compressor into the torque converter casing 21. Under this condition, the valve 35 would permit flow only if necessary to cool the casing. In this mode, the torque converter 20 is acting in effect to substantialy declutch the shaft 26 from the shaft 24 with very little if any torque being transmitted. Compressor losses, if any, are very small and the flow through valve 35, if any, is very small.

In any selected position of the fuel control 43, fuel as required will be fed through the lines 57 and 57a to the combustor 16 of the gas turbine engine 10 and the turbine 12 will function. In order to transmit torque to the shaft 26, the control 56 is moved to the drive position to stop the vacuum pump 38 and de-energize the coil 53. The piston 49 of the valve 33 now moves down by spring 50 pressure to provide communication between the ports 46 and 47, directing fluid to the torque converter casing 21 until the density therein attains its maximum value. The manual control 43 can then be moved to any desired speed position. As the temperature of the turbine rises toward an optimum predetermined value, a signal from the thermocouple 50a will be provided moving the piston 49 of the valve 33 to throttle or modulate the flow between the ports 46 and 47, varying fluid flow from the compressor 11 to the casing 21 of the torque converter 20. As the turbine temperature further rises, the piston 49 will finally interrupt the flow and possibly even open communication between the ports 47 and 48 to permit flow from the casing 21 of the torque converter 20 outwardly to the vacuum tank 40.

As the piston 49 moves upwardly closing the flow path between the ports 46 and 47, the presure differential on the piston is only that due to the throttling effect but as the piston moves to reduce the pressure in the casing to the required level, a pressure differential will exist between ports 46, 47 so that the valve 33 will be sensitive to the presure within the casing as it is opening communication between ports 47 and 48.

Thus, since the valve 33 is pressure sensitive, it will respond to the pressure condition within the casing 21 of the torque converter 20 and thereby produce a pressure therein proportionate to the signal it is receiving. More effective and accurate control of the system is made possible by the sensitivity of the valve 33 to pressure within the torque converter 20.

The action of the piston 49 is further modulated by a signal from the control 43 produced by monitoring the difference between the setting of the control 43 and the actual speed of the turbine 11. During acceleration, a signal will be transmitted to tend to move the piston upwardly against the action of the spring, thus throttling the flow between the compressor and the casing 21 of the torque converter 20, to limit bleed-off from the compressor 11 and thus maintain maximum efficiency of the engine gas cycle. If the magnitude of the signal is sufficient, the piston 49 may move to a point where flow will be permitted from the casing 21 to the vacuum tank 40. In the case of deceleration, the signal from the control is in the opposite direction causing the piston 49 to move downwardly and provide full pressure flow to the casing 21, thereby increasing the output load on the turbine, the torque converter 20 acting as a brake.

When the piston 49 has moved to a position permitting flow from the casing 21 to the vacuum tank 40 and a new presure differential is established, the piston 49 will be urged by the spring downwardly, as viewed in FIG. 2, to interrupt the flow from the casing 21 to the vacuum tank 40. At this point in time, there will be no flow into the casing and, as the temperature of the fluid therein rises, the presure will also rise causing the piston to throttle between ports 47 and 48 and maintain the pressure differential. At this point, the input torque capacity of the aerodynamic torque converter 20 is slowly being reduced because of the lowering of the density within the converter, which in turn is caused by raising the temperature of the air at essentially constant presure. As the temperature rise is a slow phenomena, there is time now for sensing the loss in capacity of the torque converter from the turbine 12 temperature and the valve 33 will be signalled for a continuing higher presure until the torque converter presure is sufficient to permit flow in line 31 past the check valve 32 to the connection with the combustor 16 upstream of the turbine 12, thereby recovering the thermodynamic losses of the torque converter 20.

In all conditions of the system, if the temperature in the casing as sensed by the sensor 36 exceeds a predetermined value, the valve 35 will open to permit cooling air flow from the compressor 11 to the casing 21 to protect the materials of the torque converter. This is also a slow phenomena permitting time for the cooling effect upon the density of the air within the converter 20 and the associated increase in capacity of the converter 20 to be sensed from the temperature of the turbine 12 and compensated for by the valve 33.

The control system heretofore described has the following advantages:

(1) The system minimizes the net bleed of air from the gas turbine engine by trapping the volume of air in the converter between the check valve 32 and the valve 33 when it is necessary to bleed air from the converter to drop the pressure so that there will be a fast response. The net bleeding of air from the engine gas cycle through the converter is done only when the torque converter is at its maximum temperature and further reduction of density within the converter is not practical by temperature change. Since the full effect of temperature in reducing the torque capacity of the converter 20 is attained when the converter is at its maximum temperature, the work into the converter is low and therefore the converter's losses are low and the amount of air to cool the converter is proportionally small.

(2) The system provides for rapid accurate changes in torque capacity of the converter in response to signals from various elements in the system.

(3) The system facilitates a rapid acceleration of the gas turbine engine by reducing the output load on the turbine 11 when there is a sudden increase in speed setting.

(4) The system provides for proportioning the load on the gas turbine engine to reduce the torque capacity of the aerodynamic torque converter an amount necessary for the turbine to provide its remaining power to other loads driven directly by the turbine.

(5) The system utilizes only two powered valves and all other valves are check valves.

(6) The system utilizes a vacuum pump that provides an effective clutch in addition to reducing the drag during the starting cycle.

(7) The system provides for maintaining any desired turbine inlet or exhaust temperature schedule with variations in load thereby improving the part load fuel economy.

I claim:

1. A control system for a gas turbine engine with an aerodynamic torque converter drive wherein said engine includes a combustor delivering high temperature gas to a turbine which drives a compressor delivering compressed fluid to the combustor, and said torque converter includes a casing filled with compressible fluid delivered through a first fluid line from the discharge side of the compressor, with a second fluid line for returning fluid from the casing to the engine gas cycle upstream of the turbine, an input rotor in said casing and connected to be driven by said turbine, and an output rotor in said casing and driven by fluid action upon rotation of said input rotor to deliver torque relative to the density of the fluid in said casing, said control system being operable to vary said density and comprising (a) valve means in said first fluid line operable to variably direct fluid flow from the compressor to said torque converter casing or to variably direct fluid flow from said torque converter casing to atmosphere, (b) temperature responsive means sensing turbine operating temperatures and operably connected with said valve to actuate same as turbine temperature increases to a selected value to variably throttle fluid flow from the compressor to said casing and on increase above said selected value to interrupt fluid from the compressor and variably divert fluid from said casing to atmosphere.

2. The system as defined in claim 1 wherein said valve means senses pressure differential between the compressor and the casing and operates to variably close communication therebetween relative to pressure rise in said casing.

3. The system as defined in claim 1 including means biasing said valve means toward a position opening communication between the compressor and the casing.

4. The system as defined in claim 1 and including means sensing predetermined temperature rise of said torque converter and operable thereupon to deliver cooling fluid from said compressor to said casing independently of operation of said valve means.

5. The system as defined in claim 1 and including (a) speed control means variably delivering fuel to said combustor to vary turbine speed, and (b) means responsive to the difference between the setting of said speed control means and actual turbine speed and connected with said valve means to operate same in a manner to reduce the torque converter load to assist turbine acceleration and increase the torque converter load to assist turbine deceleration.

6. The system as defined in claim 1 including sub-atmospheric means connected with said valve means and operable to effect rapid diverting of fluid from said casing to atmosphere.

7. The system as defined in claim 6 in which said sub-atmospheric means comprises a vacuum tank and a venturi operated by discharge from said compressor to evacuate said tank during engine operation.

8. The system as defined in claim 1 and including means operable on starting said engine to reduce pressure in said casing to sub-atmospheric.

9. The system as defined in claim 8 and in which said last mentioned means comprises a vacuum pump connected with said valve means and connected thereby with said casing only upon starting said engine.

10. The system as defined in claim 1 and including a check valve in said second line operable to permit flow from the casing to upstream of the turbine when fluid pressure in said casing exceeds fluid pressure upstream of said turbine.

11. In a gas turbine engine with aerodynamic torque converter drive system wherein said engine includes a combustor delivering high temperature gas to a turbine which drives a compressor delivering compressed fluid to the combustor, and said torque converter includes a casing filled with compressible fluid delivered through a first fluid line from the discharge side of the compressor, with a second fluid line for returning fluid from the casing to the engine gas cycle upstream of the turbine, an input rotor in said casing and connected to be driven by said turbine, and an output rotor in said casing and driven by fluid action upon rotation of said input rotor to deliver torque relative to the density of the fluid in said casing, and means sensing turbine operating temperature, the method of controlling the system which comprises modulating fluid flow in said first fluid line in response to variations in the operating temperature of said turbine, and variably diverting fluid from said casing to atmosphere in response to rise in turbine operating temperature beyond a predetermined valve.

12. The method as defined in claim 11 and including the step of modulating fluid in said first fluid line in response to variations in pressure differential between the compressor and the torque converter casing.

13. The method as defined in claim 12 and including the step of diverting fluid from said casing as the pressure differential of casing pressure over compressor discharge pressure exceeds a predetermined value.

14. The method as defined in claim 11 wherein said system includes means sensing differences between desired and actual turbine speeds, the step of modulating fluid flow to or from said casing relative to said differences to decrease density in said casing for assisting turbine acceleration and to increase density in said casing for assisting turbine deceleration.

References Cited
UNITED STATES PATENTS 3,314,232   4/1967   Hill ---------------- 60—39.24

MARK M. NEWMAN, Primary Examiner

DOUGLAS HART, Assistant Examiner

U.S. Cl. X.R.

60—12, 39.24

PO-1050
(5/69)

UNITED STATES PATENT OFFICE
CERTIFICATE OF CORRECTION

Patent No. 3,500,637  Dated March 17, 1970

Inventor(s) William W. Toy

It is certified that error appears in the above-identified patent and that said Letters Patent are hereby corrected as shown below:

IN THE SPECIFICATION:

Column 2, line 52, after "from" insert --the line 30-- ;

Column 3, line 26, after "pump" insert --38-- ;

line 38, change "finaly" to --finally-- ;

Column 4, line 5, change "substantialy" to --substantially-- ;

line 37, change "presure" to --pressure-- ;

line 64, change "presure" to --pressure-- ;

line 70, change "presure" to --pressure-- ;

Column 5, line 1, change "presure" to --pressure-- ;

line 5, change "presure" to --pressure-- ;

line 6, change "presure" to --pressure-- .

SIGNED AND SEALED

AUG 4 - 1970

(SEAL)
Attest:

Edward M. Fletcher, Jr.
Attesting Officer

WILLIAM E. SCHUYLER, JR.
Commissioner of Patents